(12) United States Patent
Pietraski et al.

(10) Patent No.: US 7,555,040 B2
(45) Date of Patent: Jun. 30, 2009

(54) METHOD AND APPARATUS FOR GENERATING EQUALIZER FILTER TAP COEFFICIENTS

(75) Inventors: Philip J. Pietraski, Huntington Station, NY (US); Mihaela Beluri, Glen Cove, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 583 days.

(21) Appl. No.: 11/216,818

(22) Filed: Aug. 31, 2005

(65) Prior Publication Data

US 2007/0189373 A1    Aug. 16, 2007

Related U.S. Application Data

(60) Provisional application No. 60/625,627, filed on Nov. 5, 2004.

(51) Int. Cl.
*H03K 5/159* (2006.01)
*H04B 1/10* (2006.01)

(52) U.S. Cl. ........................ 375/232; 375/350
(58) Field of Classification Search ........... 375/148, 375/229–233, 340, 346–350
See application file for complete search history.

(56) References Cited

U.S. PATENT DOCUMENTS

| | | | | |
|---|---|---|---|---|
| 5,390,364 | A * | 2/1995 | Webster et al. | 455/506 |
| 5,844,848 | A | 12/1998 | Cho | |
| 5,844,941 | A | 12/1998 | Mack et al. | |
| 6,175,588 | B1 * | 1/2001 | Visotsky et al. | 375/148 |
| 6,285,709 | B1 * | 9/2001 | Alelyunas et al. | 375/233 |
| 6,426,973 | B1 * | 7/2002 | Madhow et al. | 375/231 |
| 6,449,320 | B1 | 9/2002 | Lindoff | |
| 6,526,105 | B1 | 2/2003 | Harikumar et al. | |
| 6,587,504 | B1 | 7/2003 | Murakami et al. | |
| 6,795,494 | B1 | 9/2004 | Phanse et al. | |

(Continued)

FOREIGN PATENT DOCUMENTS

TW    367662    8/1999

(Continued)

OTHER PUBLICATIONS

Harteneck, et al., "Practical Implementation Aspects of MMSE Equalisation in a 3GPP HSDPA Terminal," Vehicular Technology Conference, 2004. VTC 2004-Spring. 2004 IEEE 59th vol. 1, Issue, May 17-19, 2004 pp. 445-449 vol. 1.

(Continued)

*Primary Examiner*—Khanh C Tran
(74) *Attorney, Agent, or Firm*—Volpe and Koenig, P.C.

(57) ABSTRACT

A method and apparatus generating an error signal and an update vector signal used to generate filter tap coefficients for an equalizer filter residing in an equalizer. The equalizer filter outputs an equalized signal in response to receiving a sample data stream. The error signal is generated by down-sampling the equalized signal, subtracting the equalized signal from a reference signal, and filtering and down-sampling the resulting signal. Simultaneously, the update vector signal is generated by converting scalar samples of the sample data stream to a data vector signal and descrambling, filtering, and down-sampling the data vector signal. A tap coefficients generator is used to generate the filter tap coefficients for updating the equalizer filter based on the error signal and the update vector signal.

51 Claims, 2 Drawing Sheets

U.S. PATENT DOCUMENTS

| | | | |
|---|---|---|---|
| 7,006,581 B2 * | 2/2006 | Vigil | 375/316 |
| 7,301,990 B2 * | 11/2007 | Jayaraman et al. | 375/148 |
| 2003/0126170 A1 | 7/2003 | Ling et al. | |
| 2003/0227968 A1 | 12/2003 | Kim et al. | |
| 2004/0127164 A1 | 7/2004 | Mondragon-Torres et al. | |
| 2006/0039492 A1 | 2/2006 | Azadet et al. | |

FOREIGN PATENT DOCUMENTS

| | | |
|---|---|---|
| TW | 562347 | 11/2003 |
| WO | 2004/006525 | 1/2004 |

OTHER PUBLICATIONS

Harteneck, et al., "Practical Implementation Aspects of MMSE Equalisation in a 3GPP HSDPA Terminal," Vehicular Technology Conference, 2004. VTC 2004-Spring. 2004 IEEE 59th vol. 1, Issue, May 17-19, 2004 pp. 445-449 vol. 1.

* cited by examiner

METHOD AND APPARATUS FOR GENERATING EQUALIZER FILTER TAP COEFFICIENTS

CROSS REFERENCE TO RELATED APPLICATION

This application claims the benefit of U.S. provisional application No. 60/625,627 filed Nov. 5, 2004, which is incorporated by reference as if fully set forth.

FIELD OF THE INVENTION

The present invention relates to an equalizer used in a receiver. More particularly, the present invention relates to a method and apparatus for generating tap coefficients for an equalizer filter residing in the equalizer.

BACKGROUND

Adaptive equalizers, such as normalized least mean square (NLMS) equalizers which are used in wireless transmit/receive units (WTRUs) and base stations, optimize their associated filter tap weights through an iterative procedure to reach a convergence. In the case of a pilot-directed equalizer, an error signal used to generate an update of the equalizer tap weights is derived by measuring the difference between the locally generated reference signal and the output of the equalizer. For a frequency division duplex (FDD) system, this amounts to supplying a reference signal that corresponds to a scrambled, spread and/or scaled pilot signal such that data symbols have the desired amplitude.

When operated at a chip rate, the output of a pilot-directed equalizer includes a plurality of signals superimposed on one another whereby only one of which is the pilot signal. Since the pilot signal is small in comparison to the total output signal, the error signal generated for filter coefficient adaptation includes mostly undesired signals.

SUMMARY

The present invention is related to a method and apparatus generating an error signal and an update vector signal used to generate filter tap coefficients for an equalizer filter residing in an equalizer. The equalizer filter outputs an equalized signal in response to receiving a sample data stream. The error signal is generated by down-sampling the equalized signal, subtracting the equalized signal from a reference signal, and filtering and down-sampling the resulting signal. Simultaneously, the update vector signal is generated by converting scalar samples of the sample data stream to a data vector signal and descrambling, filtering, and down-sampling the data vector signal. A tap coefficients generator is used to generate the filter tap coefficients for updating the equalizer filter based on the error signal and the update vector signal.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

Figure 1:
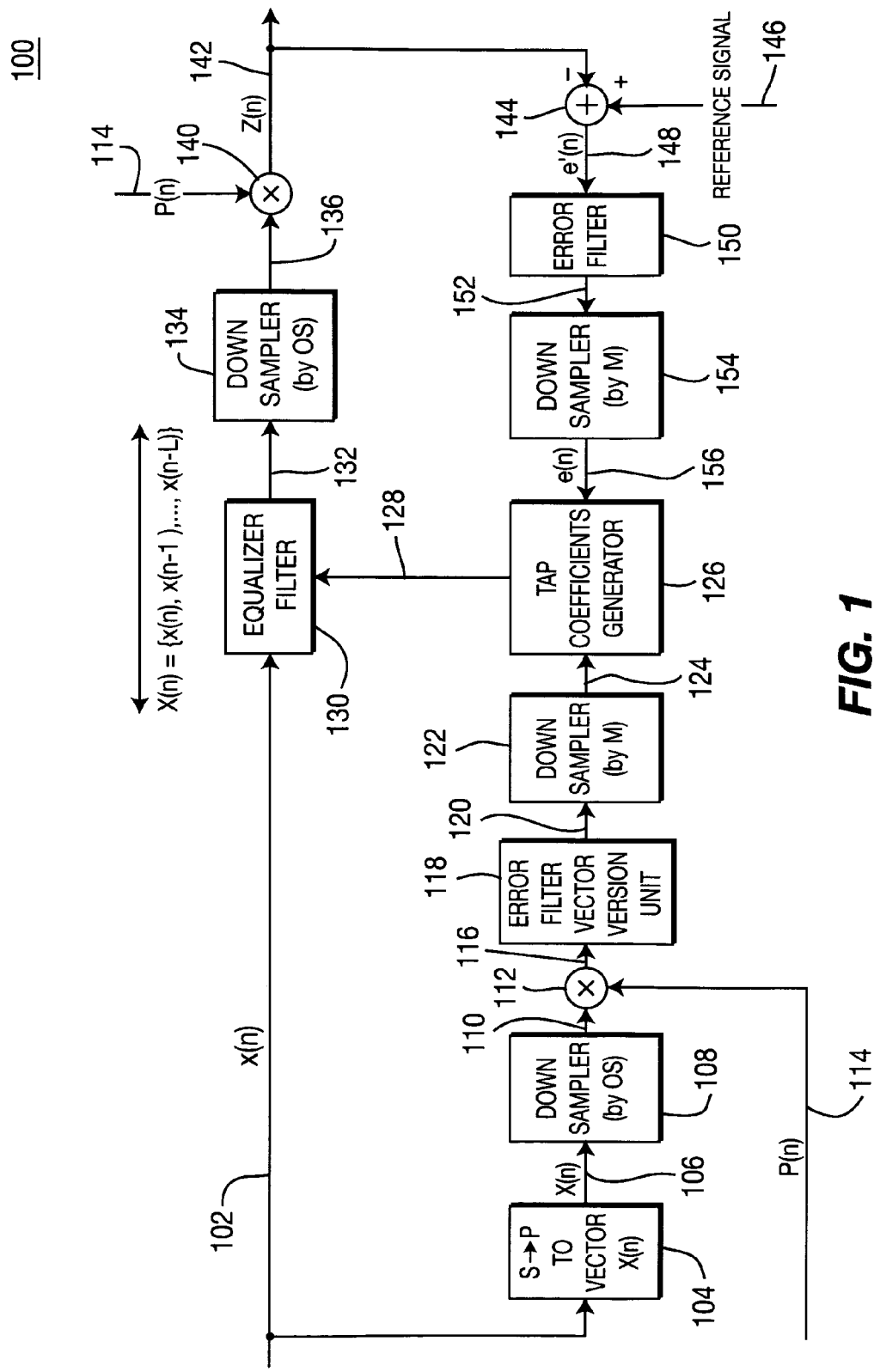
FIG. 1 is a block diagram of an exemplary adaptive equalizer including an equalizer filter in accordance with the present invention.

The preferred embodiments will be described with reference to the drawing figures where like numerals represent like elements throughout.

Hereafter, the terminology "WTRU" includes but is not limited to a user equipment (UE), a mobile station, a laptop, a personal data assistant (PDA), a fixed or mobile subscriber unit, a pager, or any other type of device capable of operating in a wireless environment. When referred to hereafter, the terminology "base station" includes but is not limited to an access point (AP), a Node-B, a site controller or any other type of interfacing device in a wireless environment.

The features of the present invention may be incorporated into an integrated circuit (IC) or be configured in a circuit comprising a multitude of interconnecting components.

The present invention is applicable to both a pilot-directed equalizer and a data-directed equalizer. For simplicity, the present invention will be explained with reference to only the pilot-directed equalizer.

Hereafter, the present invention will be explained with reference to an NLMS algorithm. However, it should be noted that any type of adaptive equalization or filtering, such as least mean square (LMS), Griffith's algorithm, recursive least square (RLS), channel estimation based NLMS (CE-NLMS), and other iterative or recursive algorithms using error signal feedback in filter coefficient adaptation may be used.

FIG. 1 is a block diagram of an exemplary adaptive equalizer 100 in accordance with the present invention. The adaptive equalizer includes a serial-to-parallel (S→P) to vector converter 104, down-samplers 108, 122, 134, 154, descrambling multipliers 112 and 140, an error filter vector version unit 118, a tap coefficients generator 126, an equalizer filter 130, an adder 144 and an error filter 150.

An input sample data stream 102 is input to the equalizer filter 130 and the S→P to vector converter 104. The equalizer filter 130 is preferably a finite impulse response (FIR) filter. The equalizer filter 130 processes the sample data stream 102 with filter coefficients which are updated by the tap coefficients generator 126. The sequence of the sample data stream 102 may be generated at any sampling rate, but preferably two times (2×) the chip rate. The equalizer filter 130 outputs an equalized signal 132 which is down-sampled by the down-sampler 134.

If the sample data stream 102 undergoes over-sampling (OS), the equalized signal 132 is down-sampled by a factor of OS, by the down-sampler 134. The down-sampler 134 generates a down-sampled signal 136 which is then multiplied with a scrambling code conjugate signal 114, P(n), by the descrambling multiplier 140 to generate a descrambled equalized signal 142 which is always maintained at the chip rate. The descrambled equalized signal 142 is then subtracted from a reference signal 146 by the adder 144 to generate an error signal 148 which is input to the error filter 150. The reference signal 146 may be a scaled pilot signal, (e.g., a pilot in a common pilot channel (CPICH)). The error signal 148 is filtered by the error filter 150. For example, an N-moving average filter may be used as the error filter 150, whereby N is a despreading factor that is applied to the reference signal 146.

The equalized signal 132 includes a plurality of signals superimposed on one another, whereby only one is the pilot signal. Since the pilot signal is small in comparison to the total equalized signal 132, the resulting error signal 148 is substantially an undesired signal. The error filter 150, (e.g., a low pass filter (LPF)), filters the undesired signal components from the error signal 148 to generate a filtered error signal 152 which is optionally down-sampled by the down-sampler 154 at a desired down-sampling rate M to generate a down-sampled error signal 156. The down-sampled error signal 156 is input to the tap coefficients generator 126.

The S→P to vector converter 104 converts the scalar samples of the sample data stream 102, x(n), to a data vector signal 106, X(n), such that X(n)={x(n), x(n−1), ..., x(n−L)}, where L is the length of the equalizer filter 130. The S→P to vector converter 104 is similar to a tapped delay line (TDL) of the equalizer filter 130, whereby the data vector signal 106 indicates the state of the TDL used to generate the equalized signal 132. The data vector signal 106 undergoes the same vector version of the processing, (i.e., down-sampling, descrambling, filtering, followed by down-sampling), that the equalized signal 132 has undergone, such that the down-sampled error signal 156 and the data vector signal 124 are kept aligned.

The data vector signal 106 is down-sampled by the down-sampler 108 to generate a down-sampled vector signal 110. If the sample data stream 102 undergoes over sampling (OS), the down-sampled signal 110 is down-sampled by the down-sampler 108 by a factor of OS and is then multiplied with the scrambling code conjugate signal 114, P(n), by the descrambling multiplier 112 to generate a descrambled vector signal 116. The error filter vector version unit 118 is essentially a bank of filters, where each filter in the bank is the substantially identical to the error filter 150. The number of filters in the bank is equal to the length of the descrambled vector signal 116. Each element of the vector is effectively filtered in the same way as the error filter 150. The error filter vector version unit 118 generates a filtered update vector signal 120 which is optionally down-sampled by the down-sampler 122 at a desired down-sampling rate M to generate a down-sampled update vector signal 124. The down-sampled update vector signal 124 is input to the tap coefficients generator 126.

The tap coefficients generator 126 generates tap coefficients 128 for use by the equalizer filter 130 based on the down-sampled update vector signal 124 and the down-sampled error signal 156. The tap update may be performed using any type of adaptive equalization or filtering, such as LMS, Griffith's algorithm, RLS, CE-NLMS) or any other iterative or recursive algorithms using error signal feedback in filter coefficient adaptation. For example, the equation for the NLMS would be $$\vec{w}_n = \alpha \cdot \vec{w}_{n-1} + \mu \frac{\vec{x}^H}{\|\vec{x}\|^2 + \varepsilon} \cdot e$$

where the down-sampled update vector signal 124 is x, e is down-sampled error signal 156, parameters α, μ are optional leakage and step size parameters, respectively, and w is the updated tap coefficients 128. The subscripts n and n−1 indicate that the previous value of w is used to compute the current value of w. The parameter ε is used to optionally prevent division by zero.

In accordance with the present invention, the tap coefficients generator 126 operates with a cleaner error signal and provides better performance in terms of convergence speed and miss-adjustment. Down-sampling also permits lower complexity operation in very slow moving channels.

The present invention may be applied to diversity structures. For example, the outputs of two equalizer filters 130 operating on two receive diversity antennas may be combined. The combined signal may then be descrambled and subtracted from a reference signal. The resulting error signal may be used to drive a tap coefficients generator 126 associated with each antenna.

Figure 2:
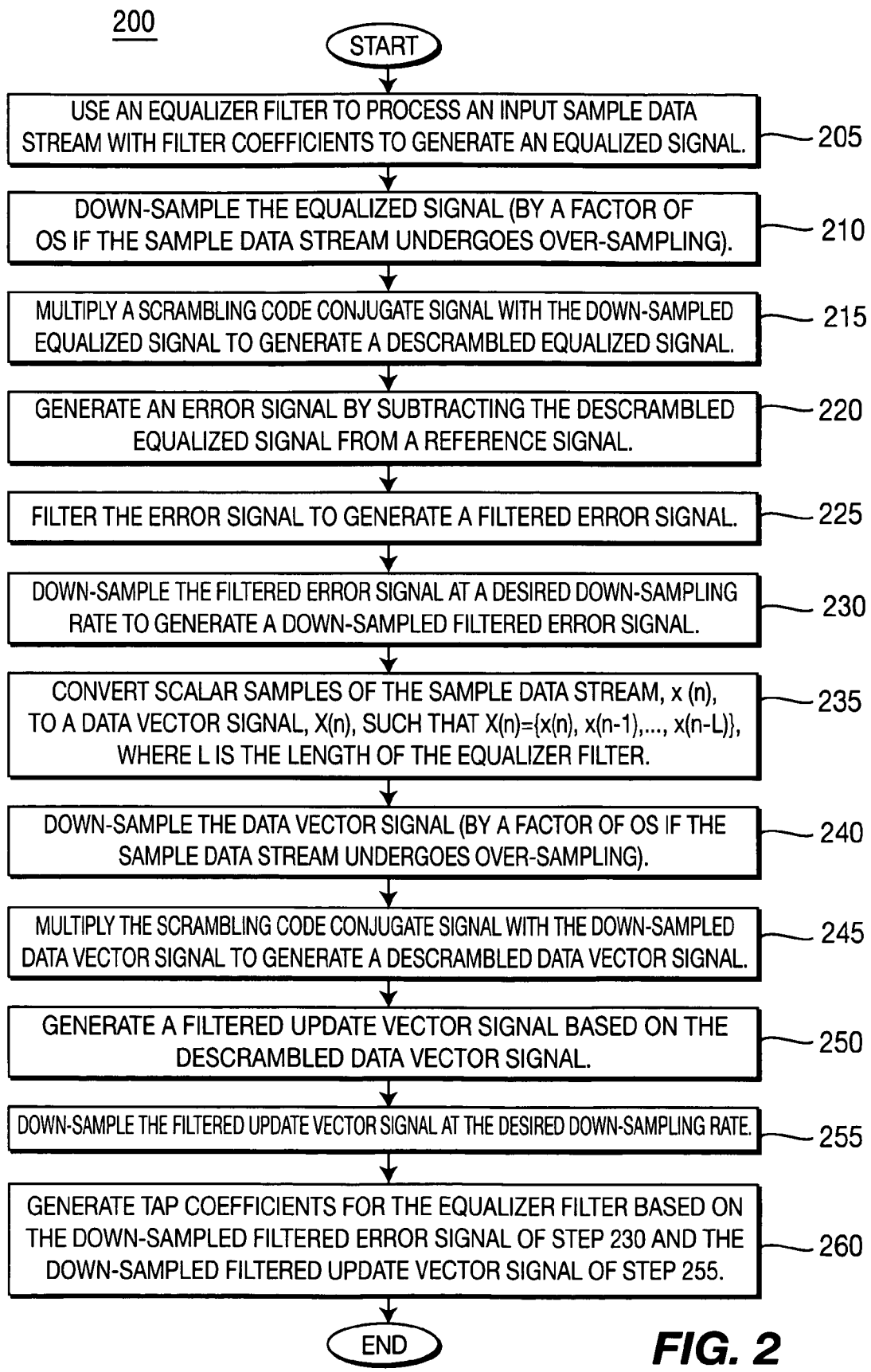
FIG. 2 is a flow diagram of a process for generating tap coefficients for the equalizer filter of the adaptive equalizer of FIG. 1.

FIG. 2 is a flow diagram of a process 200 including method steps for generating tap coefficients 128 for the equalizer filter 130 of FIG. 1. In step 205, the equalizer filter 130 is used to process an input sample data stream 102 with filter coefficients to generate an equalized signal 132. In step 210, the equalized signal 132 is down-sampled, (by a factor of OS if the sample data stream undergoes over-sampling). In step 215, a scrambling code conjugate signal 114 is multiplied with the down-sampled equalized signal 136 to generate a descrambled equalized signal 142. In step 220, an error signal 148 is generated by subtracting the descrambled equalized signal 142 from a reference signal 146. In step 225, the error signal 148 is filtered to generate a filtered error signal 152. In step 230, the filtered error signal 152 is down-sampled at a desired down-sampling rate to generate a down-sampled filtered error signal 156. In step 235, scalar samples of the sample data stream 102, x(n), are converted to a data vector signal 106, X(n), such that X(n)={x(n), x(n−1), ..., x(n−L)}, wherein L is the length of the equalizer filter 130. In step 240, the data vector signal 106 is down-sampled, (by a factor of OS if the sample data stream undergoes over-sampling). In step 245, the scrambling code conjugate signal 114 is multiplied with the down-sampled data vector signal to generate a descrambled data vector signal 116. In step 250, a filtered update vector signal 120 is generated based on the descrambled data vector signal 116. In step 255, the filtered update vector signal 120 is down-sampled at the desired down-sampling rate. In step 260, tap coefficients are generated for the equalizer filter 130 based on the down-sampled filtered error signal 156 of step 230 and the down-sampled filtered update vector signal 124 of step 255.

While the present invention has been described in terms of the preferred embodiment, other variations which are within the scope of the invention as outlined in the claims below will be apparent to those skilled in the art.

What is claimed is:

1. An equalizer comprising:
an equalizer filter for processing an input sample data stream with filter coefficients to generate an equalized signal;
a first multiplier for multiplying a scrambling code conjugate signal with the equalized signal to generate a descrambled equalized signal;
an adder for generating an error signal by subtracting the descrambled equalized signal from a reference signal;
an error filter for filtering the error signal to generate a filtered error signal;
a tap coefficients generator for generating tap coefficients based on the filtered error signal for updating the filter coefficients of the equalizer filter; and
a first down-sampler inserted between the equalizer filter and the first multiplier for down-sampling the equalized signal, wherein if the sample data stream undergoes over-sampling (OS), the equalized signal is down-sampled by the first down-sampler by a factor of OS.

2. The equalizer of claim 1 further comprising:
a second down-sampler inserted between the error filter and the tap coefficients generator for down-sampling the filtered error signal at a desired down-sampling rate.

3. The equalizer of claim 2 further comprising:
a serial-to-parallel (S→P) to vector converter which converts scalar samples of the sample data stream, x(n), to a data vector signal, X(n), such that X(n)={x(n), x(n−1), . . . , x(n−L)}, wherein L is the length of the equalizer filter;
a second multiplier for multiplying the scrambling code conjugate signal with the data vector signal to generate a descrambled data vector signal; and
an error filter vector version unit for generating a filtered update vector signal based on the descrambled data vector signal, wherein the tap coefficients generated by the tap coefficients generator are also based on the filtered update vector signal.

4. The equalizer of claim 3 further comprising:
a third down-sampler inserted between the S→P to vector converter and the second multiplier for down-sampling the data vector signal, wherein if the sample data stream undergoes OS, the data vector signal is down-sampled by the third down-sampler by a factor of OS.

5. The equalizer of claim 4 further comprising:
a fourth down-sampler inserted between the error filter vector version unit and the tap coefficients generator for down-sampling the filtered update vector signal at a desired down-sampling rate.

6. The equalizer of claim 1 wherein the equalizer filter is a finite impulse response (FIR) filter.

7. The equalizer of claim 1 wherein the tap coefficients generator generates the tap coefficients based on a normalized least mean square (NLMS) algorithm.

8. An equalizer comprising:
an equalizer filter for processing an input sample data stream with filter coefficients to generate an equalized signal;
a first multiplier for multiplying a scrambling code conjugate signal with the equalized signal to generate a descrambled equalized signal;
an adder for generating an error signal by subtracting the descrambled equalized signal from a reference signal;
an error filter for filtering the error signal to generate a filtered error signal;
a tap coefficients generator for generating tap coefficients based on the filtered error signal for updating the filter coefficients of the equalizer filter;
a serial-to-parallel (S→P) to vector converter which converts scalar samples of the sample data stream, x(n), to a data vector signal, X(n), such that X(n)={x(n), x(n−1), . . . , x(n−L)}, wherein L is the length of the equalizer filter;
a second multiplier for multiplying the scrambling code conjugate signal with the data vector signal to generate a descrambled data vector signal; and
an error filter vector version unit for generating a filtered update vector signal based on the descrambled data vector signal, wherein the tap coefficients generated by the tap coefficients generator are also based on the filtered update vector signal.

9. An equalizer comprising:
an equalizer filter for processing an input sample data stream with filter coefficients to generate an equalized signal;
a serial-to-parallel (S→P) to vector converter which converts scalar samples of the sample data stream, x(n), to a data vector signal, X(n), such that X(n)={x(n), x(n−1), . . . , x(n−L)}, wherein L is the length of the equalizer filter;
a first multiplier for multiplying the scrambling code conjugate signal with the data vector signal to generate a descrambled data vector signal;
an error filter vector version unit for generating a filtered update vector signal based on the descrambled data vector signal; and
a tap coefficients generator for generating tap coefficients based on the filtered update vector signal for updating the filter coefficients of the equalizer filter.

10. The equalizer of claim 9 further comprising:
a first down-sampler inserted between the S→P to vector converter and the first multiplier for down-sampling the data vector signal, wherein if the sample data stream undergoes OS, the data vector signal is down-sampled by the first down-sampler by a factor of OS.

11. The equalizer of claim 10 further comprising:
a second down-sampler inserted between the error filter vector version unit and the tap coefficients generator for down-sampling the filtered update vector signal at a desired down-sampling rate.

12. The equalizer of claim 11 further comprising:
a second multiplier for multiplying a scrambling code conjugate signal with the equalized signal to generate a descrambled equalized signal;
an adder for generating an equalizer error signal by subtracting the descrambled equalized signal from a reference signal; and
an equalized signal error filter for filtering the equalizer error signal to generate a filtered equalizer error signal, wherein the tap coefficients generated by the tap coefficients generator are also based on the filtered equalizer error signal.

13. The equalizer of claim 12 further comprising:
a third down-sampler inserted between the equalizer filter and the second multiplier for down-sampling the equalized signal, wherein if the sample data stream undergoes over-sampling (OS), the equalized signal is down-sampled by the third down-sampler by a factor of OS.

14. The equalizer of claim 13 further comprising:
a fourth down-sampler inserted between the second error filter and the tap coefficients generator for down-sampling the filtered equalizer error signal at the desired down-sampling rate.

15. The equalizer of claim 9 wherein the equalizer filter is a finite impulse response (FIR) filter.

16. The equalizer of claim 9 further comprising:
a second multiplier for multiplying a scrambling code conjugate signal with the equalized signal to generate a descrambled equalized signal;
an adder for generating an equalizer error signal by subtracting the descrambled equalized signal from a reference signal; and
an equalized signal error filter for filtering the equalizer error signal to generate a filtered equalizer error signal, wherein the tap coefficients generated by the tap coefficients generator are also based on the filtered equalizer error signal.

17. The equalizer of claim 9 wherein the tap coefficients generator generates the tap coefficients based on a normalized least mean square (NLMS) algorithm.

18. An integrated circuit (IC) comprising:
an equalizer filter for processing an input sample data stream with filter coefficients to generate an equalized signal;
a first multiplier for multiplying a scrambling code conjugate signal with the equalized signal to generate a descrambled equalized signal;
an adder for generating an error signal by subtracting the descrambled equalized signal from a reference signal;

an error filter for filtering the error signal to generate a filtered error signal;

a tap coefficients generator for generating tap coefficients based on the filtered error signal for updating the filter coefficients of the equalizer filter; and a first down-sampler inserted between the equalizer filter and the first multiplier for down-sampling the equalized signal, wherein if the sample data stream undergoes over-sampling (OS), the equalized signal is down-sampled by the first down-sampler by a factor of OS.

19. The IC of claim 18 further comprising:

a second down-sampler inserted between the error filter and the tap coefficients generator for down-sampling the filtered error signal at a desired down-sampling rate.

20. The IC of claim 18 wherein the equalizer filter is a finite impulse response (FIR) filter.

21. The IC of claim 18 further comprising:

a serial-to-parallel (S→P) to vector converter which converts scalar samples of the sample data stream, x(n), to a data vector signal, X(n), such that X(n)={x(n), x(n−1), ..., x(n−L)}, wherein L is the length of the equalizer filter;

a second multiplier for multiplying the scrambling code conjugate signal with the data vector signal to generate a descrambled data vector signal; and an error filter vector version unit for generating a filtered update vector signal based on the descrambled data vector signal, wherein the tap coefficients generated by the tap coefficients generator are also based on the filtered update vector signal.

22. The IC of claim 18 wherein the tap coefficients generator generates the tap coefficients based on a normalized least mean square (NLMS) algorithm.

23. An integrated circuit (IC) comprising:

an equalizer filter for processing an input sample data stream with filter coefficients to generate an equalized signal;

a first multiplier for multiplying a scrambling code conjugate signal with the equalized signal to generate a descrambled equalized signal;

an adder for generating an error signal by subtracting the descrambled equalized signal from a reference signal;

an error filter for filtering the error signal to generate a filtered error signal;

a tap coefficients generator for generating tap coefficients based on the filtered error signal for updating the filter coefficients of the equalizer filter;

a serial-to-parallel (S→P) to vector converter which converts scalar samples of the sample data stream, x(n), to a data vector signal, X(n), such that X(n)={x(n), x(n−1), ..., x(n−L)}, wherein L is the length of the equalizer filter;

a second multiplier for multiplying the scrambling code conjugate signal with the data vector signal to generate a descrambled data vector signal; and an error filter vector version unit for generating a filtered update vector signal based on the descrambled data vector signal, wherein the tap coefficients generated by the tap coefficients generator are also based on the filtered update vector signal.

24. The IC of claim 21 further comprising:

a third down-sampler inserted between the S→P to vector converter and the second multiplier for down-sampling the data vector signal, wherein if the sample data stream undergoes OS, the data vector signal is down-sampled by the third down-sampler by a factor of OS.

25. The IC of claim 24 further comprising:

a fourth down-sampler inserted between the error filter vector version unit and the tap coefficients generator for down-sampling the filtered update vector signal at the desired down-sampling rate.

26. An integrated circuit (IC) comprising:

an equalizer filter for processing an input sample data stream with filter coefficients to generate an equalized signal;

a serial-to-parallel (S→P) to vector converter which converts scalar samples of the sample data stream, x(n), to a data vector signal, X(n), such that X(n)={x(n), x(n−1), ..., x(n−L)}, wherein L is the length of the equalizer filter;

a first multiplier for multiplying the scrambling code conjugate signal with the data vector signal to generate a descrambled data vector signal;

an error filter vector version unit for generating a filtered update vector signal based on the descrambled data vector signal; and a tap coefficients generator for generating tap coefficients based on the filtered update vector signal for updating the filter coefficients of the equalizer filter.

27. The IC of claim 26 further comprising:

a first down-sampler inserted between the S→P to vector converter and the first multiplier for down-sampling the data vector signal, wherein if the sample data stream undergoes OS, the data vector signal is down-sampled by the first down-sampler by a factor of OS.

28. The IC of claim 27 further comprising:

a second down-sampler inserted between the error filter vector version unit and the tap coefficients generator for down-sampling the filtered update vector signal at a desired down-sampling rate.

29. The IC of claim 28 further comprising:

a second multiplier for multiplying a scrambling code conjugate signal with the equalized signal to generate a descrambled equalized signal;

an adder for generating an equalizer error signal by subtracting the descrambled equalized signal from a reference signal; and an equalized signal error filter for filtering the equalizer error signal to generate a filtered equalizer error signal, wherein the tap coefficients generated by the tap coefficients generator are also based on the filtered equalizer error signal.

30. The IC of claim 29 further comprising:

a third down-sampler inserted between the equalizer filter and the second multiplier for down-sampling the equalized signal, wherein if the sample data stream undergoes over-sampling (OS), the equalized signal is down-sampled by the third down-sampler by a factor of OS.

31. The IC of claim 30 further comprising: a fourth down-sampler inserted between the second error filter and the tap coefficients generator for down-sampling the filtered equalizer error signal at a desired down-sampling rate.

32. The IC of claim 26 wherein the equalizer filter is a finite impulse response (FIR) filter.

33. The IC of claim 26 further comprising:

a second multiplier for multiplying a scrambling code conjugate signal with the equalized signal to generate a descrambled equalized signal;

an adder for generating an equalizer error signal by subtracting the descrambled equalized signal from a reference signal; and an equalized signal error filter for filtering the equalizer error signal to generate a filtered equalizer error signal, wherein the tap coefficients generated by the tap coefficients generator are also based on the filtered equalizer error signal.

34. The IC of claim 26 wherein the tap coefficients generator generates the tap coefficients based on a normalized least mean square (NLMS) algorithm.

35. A method of generating tap coefficients for an equalizer filter, the method comprising:
the equalizer filter processing an input sample data stream with filter coefficients to generate an equalized signal;
multiplying a scrambling code conjugate signal with the equalized signal to generate a descrambled equalized signal;
generating an error signal by subtracting the descrambled equalized signal from a reference signal;
filtering the error signal to generate a filtered error signal;
generating tap coefficients based on the filtered error signal for updating the filter coefficients of the equalizer filter; and
down-sampling the equalized signal, wherein if the sample data stream undergoes over-sampling (OS), the equalized signal is down-sampled by a factor of OS.

36. The method of claim 35 further comprising:
down-sampling the filtered error signal at a desired down-sampling rate.

37. The method of claim 36 further comprising:
converting scalar samples of the sample data stream, x(n), to a data vector signal, X(n), such that X(n)={x(n), x(n−1), . . . , x(n−L)}, wherein L is the length of the equalizer filter;
multiplying the scrambling code conjugate signal with the data vector signal to generate a descrambled data vector signal; and
generating a filtered update vector signal based on the descrambled data vector signal, wherein the tap coefficients are also based on the filtered update vector signal.

38. The method of claim 37 further comprising:
down-sampling the data vector signal, wherein if the sample data stream undergoes OS, the data vector signal is down-sampled by a factor of OS.

39. The method of claim 38 further comprising:
down-sampling the filtered update vector signal at the desired down-sampling rate.

40. The method of claim 35 wherein the equalizer filter is a finite impulse response (FIR) filter.

41. The method of claim 35 wherein the tap coefficients are generated based on a normalized least mean square (NLMS) algorithm.

42. A method of generating tap coefficients for an equalizer filter, the method comprising:
the equalizer filter processing an input sample data stream with filter coefficients to generate an equalized signal;
multiplying a scrambling code conjugate signal with the equalized signal to generate a descrambled equalized signal;
generating an error signal by subtracting the descrambled equalized signal from a reference signal;
filtering the error signal to generate a filtered error signal;
generating tap coefficients based on the filtered error signal for updating the filter coefficients of the equalizer filter;
converting scalar samples of the sample data stream, x(n), to a data vector signal, X(n), such that X(n)={x(n), x(n−1), . . . , x(n−L)}, wherein L is the length of the equalizer filter;
multiplying the scrambling code conjugate signal with the data vector signal to generate a descrambled data vector signal; and
generating a filtered update vector signal based on the descrambled data vector signal, wherein the tap coefficients are also based on the filtered update vector signal.

43. A method of controlling an equalizer filter, the method comprising:
the equalizer filter processing an input sample data stream with filter coefficients to generate an equalized signal;
converting scalar samples of the sample data stream, x(n), to a data vector signal, X(n), such that X(n)={x(n), x(n−1), . . . , x(n−L)}, wherein L is the length of the equalizer filter;
multiplying a scrambling code conjugate signal with the data vector signal to generate a descrambled data vector signal;
generating a filtered update vector signal based on the descrambled data vector signal; and
generating tap coefficients based on the filtered update vector signal for updating the filter coefficients of the equalizer filter.

44. The method of claim 43 further comprising:
down-sampling the data vector signal, wherein if the sample data stream undergoes OS, the data vector signal is down-sampled by a factor of OS.

45. The method of claim 44 further comprising:
down-sampling the filtered update vector signal at a desired down-sampling rate.

46. The method of claim 45 further comprising:
multiplying the scrambling code conjugate signal with the equalized signal to generate a descrambled equalized signal;
generating an equalizer error signal by subtracting the descrambled equalized signal from a reference signal; and
filtering the equalizer error signal to generate a filtered equalizer error signal, wherein the tap coefficients also based on the filtered equalizer error signal.

47. The method of claim 46 further comprising:
down-sampling the equalized signal, wherein if the sample data stream undergoes over-sampling (OS), the equalized signal is down-sampled by a factor of OS.

48. The method of claim 47 further comprising:
down-sampling the filtered equalizer error signal at the desired down-sampling rate.

49. The method of claim 43 wherein the equalizer filter is a finite impulse response (FIR) filter.

50. The method of claim 43 further comprising:
multiplying the scrambling code conjugate signal with the equalized signal to generate a descrambled equalized signal;
generating an equalizer error signal by subtracting the descrambled equalized signal from a reference signal; and
filtering the equalizer error signal to generate a filtered equalizer error signal, wherein the tap coefficients are also based on the filtered equalizer error signal.

51. The method of claim 43 wherein the tap coefficients tap coefficients are generated based on a normalized least mean square (NLMS) algorithm.

* * * * *

UNITED STATES PATENT AND TRADEMARK OFFICE
CERTIFICATE OF CORRECTION

| | | |
|---|---|---|
| PATENT NO. | : 7,555,040 B2 | Page 1 of 1 |
| APPLICATION NO. | : 11/216818 | |
| DATED | : June 30, 2009 | |
| INVENTOR(S) | : Pietraski et al. | |

It is certified that error appears in the above-identified patent and that said Letters Patent is hereby corrected as shown below:

Column 3, line 27, after the words "bank is" delete "the".

Column 3, line 42, before the words "or any" delete "CE-NLMS)" and insert therefor --CE-NLMS--.

Column 3, line 58, after the word "parameter" delete "$\epsilon$" and insert therefor --$\varepsilon$--.

Claim 46, Column 10, line 39, after the word "coefficients" insert --are--.

Claim 51, Column 10, line 60, after the words "wherein the" delete "tap coefficients".

Signed and Sealed this

First Day of June, 2010

David J. Kappos
*Director of the United States Patent and Trademark Office*